United States Patent Office 3,772,198
Patented Nov. 13, 1973

3,772,198
METHOD FOR PREPARING OVERBASED OIL SOLUBLE COMPOSITIONS
Vincent J. Cease, Aston, and Samuel C. Thomas, Jr., Prospect Park, Pa., assignors to Continental Oil Company, Ponca City, Okla.
No Drawing. Filed June 7, 1971, Ser. No. 150,732
Int. Cl. C10m 1/24, 1/40, 1/46
U.S. Cl. 252—32.7 HC                23 Claims

ABSTRACT OF THE DISCLOSURE

An overbasing process to produce alkaline earth metal compounds in lubricating oil which comprises:
(a) admix acid (sulfonic, carboxylic, phosphorus sulfide-treated olefins) with ammonium ions to neutralize;
(b) heat to from about 25° C. to about 80° C.;
(c) holding at this temperature and adding water and alkaline earth metal alkoxide-carbonate complex;
(d) heat to from about 125° C. to about 160° C. to remove volatiles; and
(e) strip with inert gas.

BACKGROUND OF THE INVENTION

(1) Field of the invention

This invention relates to oil soluble overbased compositions useful as lubricating oil additives.

(2) Brief Description of the prior art

Procedures for the preparation of oil soluble sulfonate compositions having high reserve basicity, and constituting valuable dispersant-neutralizing additives to lubricating oils are well known in the art. Considerations which are important in the preparation of overbased oil soluble compositions of the type described are the base number ultimately obtainable (indicative of the reserve basicity which is characteristic of the composition), the viscosity of the overbased composition, compatability with other lubricating oil additives, filterability and resistance to gel formation upon water contamination. It has previously been possible to prepare oil soluble overbased compositions derived from high molecular weight sulfonic acids having base numbers as high as 500 as measured by the acetic acid titration method utilized in the industry, but products having this high degree of reserve basicity are unfortunately undesirably viscous and typically have viscosities in the vicinity of 1000 centistokes at temperatures of 210° F. The more highly useful and workable products having manageable viscosity typically have maximum base numbers of from about 300 to about 400.

As examples of overbased oil soluble compositions of this type, and their methods of preparation Hunt U.S. Pat. 3,150,089 and Hunt et al. U.S. Pat. 3,150,088 may be cited. These patents respectively disclose the preparation of magnesium overbased oil soluble compositions having base numbers of up to about 400, and calcium overbased oil soluble compositions having base numbers of up to 400. As shown in Hunt et al. U.S. Pat. 3,150,088, a relationship exists between the base number of the final overbased product, the activity of the product and the viscosity thereof, which relationship limits the maximum base number which can be obtained in a given product having acceptable viscosity when the product is prepared by the method described in the cited patent.

BRIEF DESCRIPTION OF THE PRESENT INVENTION

The present invention comprises a method for preparing an overbased, oil soluble, alkaline earth metal-containing composition in which an alkaline earth metal compound selected from the group consisting of the hydroxides, carbonates and mixtures thereof of a metal selected from the group consisting of calcium and magnesium is dispersed in a non-volatile carrier of oleaginous character. Broadly described, the process comprises initially neutralizing with ammonium ions, a major portion and preferably at least 90 weight percent, of an oil soluble sulfonic acid, carboxylic acid or phosphorus sulfide-treated olefin. The average molecular weight of the acid or sulfide-treated olefin neutralized is from about 350 to about 1000. The ammonium ions employed for neutralization are preferably derived from ammonia gas, ammonium hydroxide or ammonium carbonate.

Following the neutralization to form an oil soluble ammonium salt dispersing agent, the overbasing of the composition is commenced. This is effected by adding slowly to the ammonium salt in the presence of water an alkaline earth metal alkoxide-carbonate complex derived from an alkaline earth metal selected from the group consisting of calcium and magnesium, or a mixture of this complex with an alkaline earth metal alkoxy ethoxide derived from the described metals. The preferred complex or alkoxy ethoxide-complex mixture is one which contains magnesium. The overbasing is carried out at a temperature of from about 20° C. to about 80° C.

After adding the complex to the degree necessary to obtain the extent of overbasing desired in the product, the reaction mixture is subjected to distillation to remove volatile materials therefrom. The ultimate temperature to which the distillation is carried will vary somewhat according to the volatility of certain diluents which may be used, and the reaction by-products formed. Typically, however, the mixture is distilled to a temperature of about 150° C. Finally, the crude product is stripped with an inert gas at the final distillation temperature to remove residual solvent and volatile diluent materials therefrom.

For the purpose of adjusting the precent active content (referring to the weight percent of ammonium salt dispersing agent present in the final product), and also the base number thereof, an oil soluble, non-volatile, oleaginous diluent material is added to the reaction mixture during the process. The diluent can be a naphthenic or paraffinic oil, and its primary requirement is that it be oil soluble and capable of dissolving the ammonium salt dispersing agents formed upon neutralization. The oil soluble, non-volatile diluent oil may be added during the process of the invention before the neutralization step, immediately following the neutralization step, following the overbasing step, or during the distillation. If desired, the non-volatile oleaginous diluent materials may themselves be further diluted in situ with relatively light solvents for the purpose of reducing the viscosity of the reaction mixture and final product. Suitable light diluents solvents include petroleum naphtha or hydrocarbons such as hexane, heptane, octane, benzene, toluene or xylene. A commonly used diluent for this purpose is normal hexane.

The compositions derived from the process of the invention posses several important advantages and desirable properties relative to generally similar overbased compositions as prepared by prior processes, and it is the object of the invention to attain an oil soluble, overbased composition having these advantages, which may be briefly listed, in part, as follows:

(a) greatly reduced product viscosity for a given base number and percent active content;

(b) better compatibility of the product with ashless detergent additives to be included therewith in lubricating oils to which the product is to be added;

(c) better water tolerance and resistance to gel formation upon contamination with water;

(d) improved filterability of product compositions which have been contaminated with water;

(e) much higher base numbers attainable in a product of given active content, and having manageable viscosities;

(f) better compatibility with base oils used as carrier materials in the compositions formed, as well as in the lubricating oils in which the additive compositions are to be included.

A specific object is to make oil soluble, overbased compositions which have base numbers exceeding 500 and which are bright, clear and of easily manageable fluidity.

Additional objects and advantages of the invention will become apparent as the following detailed description of the invention is considered.

DETAILED DESCRIPTION OF PREFERRED EMBODIMENTS OF THE INVENTION

Considering first, the oil soluble acidic charge stock materials which are initially neutralized with ammonium ions in accordance with the process of the present invention, these materials are selected from the group consisting of oil soluble sulfonic acids, oil soluble carboxylic acids and oil soluble phosphorus sulfide-treated olefins. In general, these starting materials, to possess the requisite oil solubility, should have molecular weights (average molecular weights in the case of mixtures) in the range of from about 350 to about 1000. Preferably, the molecular weight of the starting material is from about 400 to about 800. The preferred materials subjected to neutralization are alkaryl sulfonic acids. Alkyl sulfonic acids are also within the scope of operative practice of the invention.

In further reference to the sulfonic acids which may be employed as starting materials in the practice of the present invention, those sulfonic acids constituting the precursors of the sulfonate materials identified in detail in Hunt U.S. Pat. 3,150,089 as suitable starting materials in the overbasing procedure there described constitute sulfonic acids suitable for use in the present invention. The teaching of the cited Hunt patent in this respect is incorporated herein by reference.

Sulfonic acids which have been found to be of particular utility in the practice of the present invention are alkylbenzene sulfonic acids in which the alkyl substituent of the benzene is derived from eicosene, a straight chain $C_{20}$ olefinic material; monoalkylbenzene sulfonic acids in which the alkyl substituents are highly branched and contain from about 20 to about 40 carbon atoms (sometimes referred to in the art as sulfonic acids derived from dimer alkylate); dialkylbenzene sulfonic acids in which the alkyl substituents contain from about 8 to about 18 carbon atoms; and mixtures of the described monoalkylbenzene sulfonic acids and dialkylbenzene sulfonic acids.

Mixed sulfonic acids of the types described have typically been utilized in the process of the present invention more often than have single, relatively pure acids. Examples of such mixtures, as typically formulated and used, are as follows:

MIXTURE A

This mixture of sulfonic acids is prepared by sulfonating a mixture of monoalkylbenzene compounds in which the alkyl substituents are straight chain groups derived from straight chain α-olefins containing from about 18 to about 40 carbon atoms. Eicosene is typical of such olefins. This mixture of monoalkylbenzene compounds has an average molecular weight of from about 350 to about 600.

MIXTURE B

This mixture of sulfonic acids is prepared by sulfonating a mixed alkylate material of the following composition:

| Component: | Weight percent |
|---|---|
| Dn-n-alkylbenzenes | 30–75 |
| Diphenylalkanes | 5–30 |
| Alkylated tetralins | 5–50 |
| Other materials including naphthalenes and indanes | 4–12 |

The average molecular weight of this alkylate is from about 300 to about 450, and the alkylate typically boils above 160° C. at 5 mm. Hg. The alkyl substituents of the di-n-alkylbenzenes contain from about 8 to about 18 carbon atoms and are bonded to the benzene group through a secondary carbon atom.

MIXTURE C

This mixture of sulfonic acids is very similar to that referred to in describing Mixture B, in that it is derived from a mixed alkylate quite similar to the mixed alkylate from which Mixture B is derived. In the case of Mixture C, however, the alkyl substituents in the di-n-alkylbenzene compounds present in the alkylate precursor contain an average of two carbon atoms more than the corresponding di-n-alkylbenzene compounds present in the Mixture B mixed alkylate starting material.

MIXTURE D

This mixture of sulfonic acids is derived from the sulfonation of an alkylate containing at least 70 weight percent of a mixture of monoalkaryl compounds in which the aryl group is substituted by a highly branched single alkyl substituent containing from about 20 to about 40 carbon atoms. This alkylate is generally derived from a propylene refinery stream and is referred to in the art as dimer alkylate. The average molecular weight of the alkylate is from about 350 to about 600.

MIXTURE E

This mixture of sulfonic acids is very similar to Mixtures B and C and differs primarily only in the chain length of the alkyl substituents of the alkaryl sulfonic acids present. More specifically, the alkyl substituents here contain, on the average, about one more carbon atom than in the case of the Mixture B acids, and one less carbon atom than in the case of the Mixture C acids.

MIXTURE F

This mixture of sulfonic acids is derived from the sulfonation of a mixture of the two alkylates referred to in describing sulfonic acid Mixture A and sulfonic acid Mixture B. In other words, about 35 weight percent of the alkylate sulfonated to yield Mixture A is mixed with about 65 weight percent of the alkylate sulfonated to yield Mixture B, and this mixture of alkylates is then sulfonated to produce Mixture F.

MIXTURE G

This mixture of sulfonic acids is derived from the sulfonation of a mixture of the alkylates referred to in describing sulfonic acid Mixture A, sulfonic acid Mixture C, and sulfonic acid Mixture D. The sulfonated alkylate mixture contains about 35 weight percent of the Mixture A alkylate, about 50 weight percent of the Mixture C alkylate and about 15 weight percent of the Mixture D alkylate.

MIXTURE H

This mixture of sulfonic acids is derived from the sulfonation of a mixture of the alkylates referred to in describing acid Mixtures A, C, D and E. This alkylate mixture, as subjected to alkylation to yield Mixture H, contains about 35 weight percent of the Mixture A alkylate, about 25 weight percent of the Mixture C alkylate, about 15 weight percent of the Mixture D alkylate and about 25 weight percent of the Mixture E alkylate.

Suitable carboxylic acids useful as starting materials include naphthenic acids, such as the substituted cyclopentane monocarboxylic acids, the substituted cyclohexane monocarboxylic acids and the substituted aliphatic polycyclic monocarboxylic acids containing at least 15 carbon atoms. Fatty acids containing at least 8 carbon atoms and which are liquid between about 15° C. and ambient temperatures can also be used. Also useful are naturally occurring mixtures of predominantly unsaturated fatty acids, such as tall oil fatty acids.

The phosphorous sulfide-treated olefins, which can be subjected to neutralization with ammonium ion in the process of the invention, include those which are customarily used in lubricating oil formulations as corrosion inhibitors and/or detergents.

The acidic materials subjected to neutralization are preferably diluted with a light paraffinic solvent material preparatory to commencing the addition of ammonium ions for neutralization purposes. This aids in the development of a workable viscosity in the reaction mixture, and aids in the prevention of gel formation and the development of sediment in the final product. Typically, normal hexane is utilized as the diluent for this purpose in an amount of from about 50 weight percent to about 70 weight percent, but other materials may also be used.

As hereinbefore indicated, it is also optional in the process to add to the acidic starting material prior to the neutralization step, an oil soluble, non-volatile diluent oil. This is carried out for the purpose of adjusting the percent active of the final product, and also for aiding in adjusting the base number thereof. The oil soluble diluent oil may be a naphthenic oil or a paraffinic oil capable of dissolving the ammonium salt dispersing agents formed upon neutralization. Examples of suitable diluent oils include pale oils derived from petroleum; commercially available, petroleum-derived naphthenic oils, such as Sunthene 430 and Sunthene 450 marketed by Sun Oil Company of Philadelphia, Pa.; vegetable oils, such as corn oil, cottonseed oil and castor oil; and animal oils, such as lard oil, sperm oil, etc.

In carrying out the neutralization, a suitable source of ammonium ions is added to the acidic starting material. The source of ammonium ions is preferably either ammonia gas bubbled through the diluted acidic starting material, aqueous ammonium hydroxide or an ammonium carbonate solution. In the event that ammonium hydroxide or an aqueous ammonium carbonate solution is employed for neutralization, care must be exercised not to add to the reaction mixture via such solutions and water subsequently added during the process, an excessive amount of water, as hereinafter defined, since excessive water incorporated in the reaction mixture can result in the formation of undesirable haze in the final product. Moreover, where ammonium hydroxide or aqueous ammonium carbonate is utilized for neutralization, it is then important that a material, such as methyl Cellosolve, forming an azeotrope with water be added prior to commencing the neutralization.

The amount of neutralizing compound added to the acidic starting material for neutralization purposes has been found to be of considerable importance in the successful practice of the invention. Thus, neutralization should be carried forward to the point where at least a predominant amount of the acidic starting material has been neutralized. Conversely, it is important that the amount of ammonium ion added to the reaction mixture not exceed by more than about 10 weight percent, that which is required to achieve complete neutralization of the acidic materials. The most desirable and the preferred method of operation entails the addition of neutralizing agent to a degree sufficient to neutralize from about 90 weight percent to about 100 weight percent of the total acid content of the starting material.

Upon completion of the neutralization of the acidic starting material to form an oil soluble ammoniate dispersing agent, the temperature of the reaction mixture is increased, and the overbasing step is commenced. It should be pointed out, however, that prior to commencing this step of the process of the invention, any one of several intermediate steps may optionally be interjected in the process at this point. Thus, as has been previously pointed out, the non-volatile, oil soluble diluent oil, which has been hereinbefore described in detail, may be added following neutralization, instead of prior to neutralization. Moreover, it may be desirable at this time to add a process solvent to the reaction mixture. This is a relatively low molecular weight material, preferably a $C_1$–$C_4$ alcohol, and most suitably either Cellosolve, methyl Cellosolve or methyl alcohol. This solvent makes the reaction mixture more fluid and reduces the amount of BS & W (the amount of sediment as measured by a procedure substantially similar to ASTM–D–1786–62) in the final product. The amount of process solvent used is not critical, but should, for economy reasons, be minimized to that required to maintain acceptable fluidity in the mixture.

It is also permissible at this point in the process to add water to the reaction mixture for the purpose of hydrolyzing a metal containing complex added during the overbasing step as hereinafter described. The total amount of water which is incorporated in the reaction mixture for hydrolysis purposes is also hereinafter described in greater detail, and it is sufficient for the moment to state that all or a portion of this water, whether in pure or azeotrope form, may be added to the reaction mixture prior to commencing the overbasing step carried out by addition of the metal containing complex used for this purpose. Where water is added, either in pure or azeotrope form, at this point, however, then the addition of the $C_1$–$C_4$ alcohol referred to in the preceding paragraph is also very desirable.

In performing the overbasing step of the process, an alkaline earth metal alkoxide-carbonate complex of the general type described in the two Hunt patents hereinbefore cited is employed. The complex utilized has the general formula:

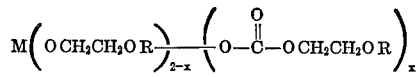

where M is a bivalent metal ion selected from the group consisting of calcium and magnesium, and R is either a $C_1$ to $C_6$ alkyl group, or an organic radical of the formula

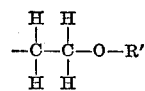

where R' is a $C_1$ to $C_4$ alkyl group, and X is from 0.5 to 1.5, and preferably from 0.75 to 1.0. In general, the complexes contain from about 5 weight percent to about 8 weight percent metal. The method of preparing these complexes is detailed in the cited patents. Alternatively to the adding of the described alkaline earth metal alkoxide-carbonate complex to the reaction mixture to achieve overbasing, a mixture of such complex with an uncarbonated alkaline earth metal alkoxy ethoxide derived from the same specific metals may be used. In such mixtures, the amount of uncarbonated alkaline earth metal alkoxy ethoxide included may range up to about 25 weight percent. The metal of the complex is preferably magnesium.

The addition of the complex, or mixture of complex with metal alkoxy ethoxide, to the reaction mixture is carried out slowly, and a preferred method of proceeding at this point entails the concurrent addition of the overbasing material and water added for the purpose of hydrolyzing the overbasing material to form alkaline earth metal carbonate or alkaline earth metal hydroxide. The total amount of water added to the reaction mixture for hydrolysis purposes is a stoichiometric excess over that which is required for theoretical hydrolysis of the overbasing material. The addition of overbasing material is carried out while the reaction mixture is maintained at a temperature of from about 25° C. to about 80° C., and preferably from about 40° to about 60° C.

The excess of water functions to prevent the formation of nondispersed solids. A suitable range of water is from 0.75 mole to 6.0 moles per mole of metal in the complex or complex-metal alkoxy ethanol mixture where the metal of the complex is calcium. Preferably, from about 1.55 moles to about 4.0 moles per mole of metal in the complex or mixture is employed. Where the metal of the complex is magnesium, the amount of water added is from about 1.5 moles to about 4.5 moles per mole of metal in the complex or mixture, with from about 1.8 moles to about 2.5 moles being preferred. As has been indicated, the magnesium complex is much preferred to the calcium complex for overbasing purposes, and the magnesium content of the complex is preferably from about 7 weight percent to about 8 weight percent.

The water is preferably added to the reaction mixture in the form of an azeotrope of the water with a $C_3$ or $C_4$ alkoxy ethanol, such as methoxy ethanol (methyl Cellosolve) and ethoxy ethanol (Cellosolve). The azetotrope may also contain a small amount of methanol. A typical azeotrope composition will contain from about 40 weight percent to about 70 weight percent water, from about 20 weight percent to about 40 weight percent methyl Cellosolve, and from 2 weight percent to about 20 weight percent methanol. The water, as has been indicated, hydrolyzes the complex to form $MeCO_3$ and/or $Me(OH)_2$ and the monomethyl ether of ethylene glycol, where Me is the divalent metal ion involved.

The situation which is confronted when an aqueous ammonium source is used for neutralization has previously been briefly mentioned. Where this mode of neutralization is used, addition of an azeotroping solvent, and preferably methyl Cellosolve, prior to the commencement of neutralization is highly desirable to prevent formation of haze in the final product. Moreover, the amount of water subsequently added, either before, or concurrently with, the addition of the metal alkoxide complex must be correspondingly reduced. In most instances, this reduction will be accomplished by not adding any water to the reaction mixture immediately prior to overbasing (addition of the complex), and then reducing the amount of water or azeotrope introduced via concurrent addition with the complex as necessary to bring the total water content within the specified range.

After the required water, preferably largely in the form of the azeotrope, and the metal-containing overbasing material have been added to the reaction mixture, the mixture is distilled to remove volatile solvents. During distillation it is believed that the ammonium cation species is displaced from the dispersing agent by the more positive and more electrophilic metal ion species present as the carbonate or hydroxide.

$$MeCO_3 + 2NH_4(RSO_3) \rightarrow Me(RSO_3)_2 + NH_3 + H_2CO_3$$
(excess)

The $H_2CO_3$ is then decomposed by the heat of distillation to $H_2O$ and $CO_2$. The equilibrium of the ion displacement reaction is greatly shifted to the right by the presence of excess theories of $MeCO_3$. Moreover, the reverse reaction is made impossible since $CO_2$ is continuously escaping from the mass.

Distillation is carried out to the point where substantially all of the light solvents and water are removed. In general, this will be to a pot temperature of from about 125° C. to about 160° C. The oil soluble, non-volatile diluent oil, to which reference has hereinbefore been made, will usually be addd prior to the distillation step, but this sequence is not essential. The oil addition can be made at any time before about 25 percent of the total light paraffin hydrocarbon diluent materials present have been distilled overhead.

After distilling to the described pot temperature, the reaction mixture is retained at this temperature while stripping the mixture for from 15 minutes to 40 minutes with an inert gas, such as $N_2$ or $CO_2$ or a mixture thereof. At a pot temperature of 147° C., about 90 weight percent of the ammonia ($NH_3$) is displaced from the reaction mixture during the gas purging.

The product remaining upon completion of the stripping is a bright, clear oil-soluble dispersion having a strikingly low viscosity for a given base number and percent active content. Moreover, useful, relatively fluid dispersions having very high base numbers can be produced by the process.

The following examples will serve to further demonstrate typical practice of the process of the invention.

Amounts of materials used

The amounts of oil-soluble ammonium salt dispersing agent, non-volatile diluent oil and basic alkaline earth metal compounds in the final product are shown in the table below in parts by weight.

|  | Suitable | Preferred |
| --- | --- | --- |
| Dispersing agent | 15–40 | 22–32 |
| Non-volatile diluent | 20–60 | 30–50 |
| Basic metal compound (as metal) | 15–45 | 25–45 |

The total amount of process solvent used at all times during the process is at least about 30 percent by weight, and preferably at least 80 percent by weight of the combined amounts of dispersing agent, nonvolatile diluent oil, and complex employed. Usually, the total amount of process solvent, on the same basis, is less than 120 percent by weight.

EXAMPLE 1

600 grams of a mixture containing 402 grams of hexane and 198 grams of mixed sulfonic acids were charged to a creased, three-necked reaction flask equipped with condenser, thermometer, and addition funnel. The mixed acids in the hexane-acid mixture were derived by combining 35 weight percent of Mixture A, 15 weight percent of Mixture D, and 50 weight percent of Mixture C. (These mixtures of acids are those hereinbefore described in detail.) The mixed sulfonic acids in the hexane-acid mixture had a combining weight of 478. 97 weight percent of the total acid content (which total acid content was 25 weight percent of the total material charged) was then neutralized with 5.2 grams of anhydrous ammonia.

Following neutralization, 30 grams of methyl Cellosolve were added to the reaction mixture, along with 15 grams of an azeotrope containing 69 weight percent water, 25.45 weight percent methyl Cellosolve and 11.10 weight percent methanol. The temperature of the mixture was then elevated to about 48° C., and overbasing of the mixture was commenced by the addition of a magnesium alkoxide-carbonate complex to the reaction mixture concurrently with addition of a further quantity of the azeotrope described above. 437 ml. of the complex were added over a period of 230 minutes, and 133 ml. of the azeotrope were added over a period of 200 minutes. The complex contained 7.8 weight percent magnesium and had a specific gravity of 1.16 gram/cc. The total amount of water added to the reaction mixture by neutralization and azeotrope addition amounted to 1.75 moles of water per mole of magnesium added via the complex.

Upon completion of the addition of the complex, 210 grams of 75 viscosity (S.S.U. at 210° F.) pale oil were added to the mixture to adjust the final activity to about 28 percent. Distillation was then commenced and carried to a pot temperature of 148° C. to remove excess water, methyl Cellosolve, hexane and the residual ammonia. Upon attainment of the pot temperature of 148° C., the mixture was stripped with inert gas for a period of 20 minutes. The inert gas contained 88 weight percent nitrogen, and 12 weight percent carbon dioxide.

The product had a percent activity of 28.7 weight percent, a base number of 310, a viscosity in centistokes at 210° F. of 38.7, and a combining weight of 490. The B.S. & W. content of the product, was 0.2 weight percent. The compatability of the product with ashless dispersant-detergent lubricating oil additives was acceptable.

EXAMPLE 2

For purposes of comparison, an oil soluble magnesium overbased composition was prepared generally in accordance with the procedure described in Hunt U.S. Pat. 3,150,089 to have a base number of about 300. In the preparation of the composition, 600 grams of the hexane-acid mixture used in Example 1 were charged to a reaction flask equipped with condenser, thermometer and addition funnel. To the charged hexane-sulfonic acid mixture were then added 25 ml. of the azeotrope material described in Example 1, and 6 grams of methyl Cellosolve.

The temperature of the reaction mixture was then elevated to about 48° C., and overbasing of the mixture was commenced by the addition of magnesium alkoxide-carbonate complex, concurrently with the addition of azeotrope, both complex and azeotrope being of the type described in Example 1. 404 ml. of the complex were added concurrently with the addition of 139 ml. of the azeotrope. Addition of the azeotrope was completed after 200 minutes from the time of starting the addition, and addition of the complex was complete 230 minutes after commencement of the addition. The total amount of water incorporated in the reaction mixture amounted to 2.1 moles of water per mole of magnesium in the complex.

Following the addition of the complex to the reaction mixture, 218 grams of 75 viscosity pale oil were added to the reaction mixture to adjust the final activity to approximately 28 weight percent in correspondence to the final activity of the product yielded in Example 1. Distillation was then commenced and carried to a pot temperature of 148° C. to remove the volatile materials from the mixture. Upon attainment of the pot temperature of 148° C., the mixture was stripped with inert gas for a period of 25 minutes.

The product had an activity of 28.5 weight percent, a base number of 303, a viscosity in centistokes at 210° F. of 195 and a combining weight of 490. The B.S. & W. weight percent. The product did not have acceptable content of the product, which was bright, was 0.25 weight percent. The product did not have acceptable compatibility with ashless dispersant-detergent lubricating oil additives.

In comparing the product obtained using the heretofore practiced overbasing procedure as described in this example with the product obtained by the process of the invention as described in Example 1, the much higher viscosity of the former will be noted.

EXAMPLE 3

For the purpose of making a product having a base number of approximately 400 by the process of the present invention, 600 grams of a mixture containing 490 grams of hexane and 210 grams of mixed sulfonic acids (as described in Example 1) were charged to a three-necked, creased reaction flask equipped with condenser, thermometer and addition funnel. 97 weight percent of the total acid content (which was 22 weight percent of the material charged) was then neutralized with 4.6 grams of anhydrous ammonia passed through the mixture.

Upon completion of the described neutralization, 6 grams of methyl Cellosolve were added to the reaction mixture, along with 14.4 ml. of the water azeotrope described in Example 1. The temperature of the mixture was then elevated to about 47° C., and overbasing of the mixture was commenced by the addition of magnesium alkoxide-carbonate complex of the type described in Example 1, concurrently with the addition to the reaction mixture of water azeotrope. 560 ml. of the complex were added over a period of 245 minutes, and 191 ml. of the azeotrope were added over a period of 215 minutes. The total amount of water added to the reaction mixture by neutralization and azeotrope addition amounted to 1.90 moles of water per mole of magnesium in the complex.

Upon completion of the addition of the complex, 200 grams of 75 viscosity pale oil were added to the mixture to adjust the final activity to the approximate level desired. Distillation was then commenced and carried out to an approximate bottoms temperature of 140° C. The mixture was then stripped with a mixture of nitrogen and carbon dioxide for a period of 30 minutes.

The product had a percent activity of 24.8 weight percent, a base number of 392, and a viscosity, in centistokes at 210° F., of 46.3. The combining weight of the product was 490. The B. S. & W. content of the product, which was bright and clear, was 0.7 weight percent. The product was compatible with a commercially available dispersent-detergent lubricating oil additive.

EXAMPLE 4

For the purpose of preparing a product by an overbasing procedure previously in commercial usage, which product would be comparable in base number and activity to the product prepared as described in Example 3, 600 grams of an acid-hexane mixture identical to that employed in Example 3 were charged to a reaction flask. 26 ml. of water azeotrope (of the type previously described) and 30 grams of methyl Cellosolve were then added to the flask, followed by elevation of the temperature of the mixture of 47° C. Overbasing was then commenced by the concurrent addition of 521 ml. of the magnesium complex used in Example 3, and 231 ml. of the water azeotrope. The complex was added over a period of 245 minutes and the azeotrope was added over a period of 215 minutes.

Upon completion of the addition of the complex and azeotrope, 208 grams of 75 viscosity pale oil were added to the reaction mixture, and distillation was then commenced. Distillation was continued to a bottoms temperature of 147° C. The mixture was then stripped with nitrogen for a period of 30 minutes.

The product resulting from the overbasing procedure, as carried out in accordance with the practice of the prior technology, had a percent activity of 25.6 weight percent, a base number of 398, and a viscosity of 237 cs. at 210° F. The B.S. & W. content of the product was 0.80 and the product's combining weight was 490. Though the product was bright and relatively clear, it failed to achieve adequate compatibilty with the commercially available ashless dispersent-detergent lubricating oil additive used in evaluating the compatibility of the product produced as described in Example 3.

EXAMPLE 5

600 grams of a mixture containing 438 grams of hexane and 162 grams of the mixture of sulfonic acids described in the previous examples were charged to a reaction flask equipped as previously described. 97 weight percent of the total acid content (which was 20 weight percent of the material charged) was then neutralized with 4.1 grams of anhydrous ammonia.

Upon completion of neutralization, 6 grams of methyl Cellosolve and 11 ml. of the described water azeotrope were added to the reaction mixture. The temperature of the mixture was then elevated to about 49° C., and overbasing of the mixture was commenced by the addition of magnesium alkoxide-carbonate complex containing 7.8 weight percent magnesium, concurrently with the addition of a further quantity of the azeotrope described in the prior examples. 660 ml. of the complex were added to the reaction mixture over a period of 245 minutes, and 257 ml. of the azeotrope were added over a period of 215 minutes. The total amount of water incorporated in the reaction mixture by acid neutralization and the addition of azeotrope amounted to 2.10 moles of water per mole of magnesium added via the complex.

After completion of the addition of the complex, 171 grams of 75 viscosity pale oil were added to the mixture to adjust the final activity to about 24 weight percent. Distillation was then commenced and carried to a pot temperature of 147° C. Upon attainment of this temperature, stripping with a mixture of nitrogen and carbon dioxide was commenced and continued for a period of 30 minutes. The product obtained had a percent activity of 24.0 weight percent, a base number of 498 and viscosity of 195.7 cs. at 210° F. The product was clear and bright and had a B.S. & W. content of 1.6 weight percent. The combining weight of the product was 490. The product had good compatibility with a commercially available ashless dispersent-detergent lubricating oil additive.

EXAMPLE 6

600 grams of the identical hexane-acid charge material used in Example 5 were charged to a reaction flask, and to this material were then added 6 grams of methyl Cellosolve and 21 grams of water azeotrope containing 69 weight percent water. Overbasing was then commenced, and for this purpose, 616 ml. of magnesium alkoxide-carbonate complex were added to the reaction mixture concurrently with 277 ml. of the azeotrope. The total water incorporated in reaction mixture by neutralization and azeotrope addition was equivalent to 2.5 moles of water per mole of magnesium added via the complex.

Upon completion of the overbasing by addition of the complex and azetrope, 180.2 grams of 75 viscosity pale oil were added to the mixture and distillation was then commenced. Distillation was carried out to a pot temperature of 148° C. The mixture was then stripped with the mixture of nitrogen and carbon dioxide used in Example 5 for a period of 30 minutes.

The product yielded had a percent activity of 24 weight percent, a base number of 505 and a viscosity of 1263.5 cs. at 210° F. The B.S. & W. content of the product was 1.5 weight percent, and the product's combining weight was 490. Although the product was bright, it failed to have adequate compatibility with the commercially available ashless dispersent additive referred to in Example 5. This example, when compared to Example 5 also strikingly illustrates the advantage of the present invention (Example 5) in enabling high base number products having relatively low viscosities to be prepared.

EXAMPLE 7

700 grams of the hexane-acid charge material used in Example 5 were charged to a reaction flask. 6.7 grams of anhydrous ammonia were then used to neutralize 97 weight percent of the acid. 4.7 grams of water azeotrope which contained 69 weight percent water and 35 grams of methyl Cellosolve were then added to the reaction mixture. The temperature of the mixture was then increased to 48° C. and overbasing was commenced.

In carrying out the overbasing step, 948 ml. of calcium alkoxide-carbonate complex containing 7.32 weight percent calcium and having a specific gravity of 1.09 were added to the reaction mixture concurrently with 88 ml. of azeotrope. The complex was added over a period of 115 minutes, and the azeotrope addition was completed in 100 minutes. The total amount of water incorporated in the mixture by neutralization and azeotrope addition was equivalent to a mole ratio of water to azeotrope of 1:1.

After the complex and azeotrope addition was completed, 158 grams of 75 pale oil were added to the mixture, and distillation then carried out to a pot temperature of 150° C. The mixture was then stripped with nitrogen.

625.3 grams of a bright product having a base number of 314.0 and a percent activity of 32.7 weight percent were yielded. The product had a combining weight of 485 and a B.S. & W. value of 0.30 weight percent. Its viscosity at 210° F. was 132 centistokes.

EXAMPLE 8

700 grams of the hexane-acid charge material used in Example 7 were charged to a reaction flask. 6.7 grams of anhydrous ammonia were then used to neutralize 97 weight percent of the acid. 2.7 grams of water azeotrope containing 69 weight percent water, and 35 grams of methyl Cellosolve were then added to the reaction mixture. The temperature of the mixture was then increased to 49° C. and overbasing was started.

948 grams of calcium alkoxide-carbonate complex containing 7.32 weight percent of the metal, and having a specific gravity of 1.09 were then added to the reaction mixture concurrently with 70 ml. of azeotrope. The azeotrope was added to the mixture within a period of 100 minutes, and the complex was added over a period of 115 minutes. The total amount of water incorporated in the mixture yielded a mole ratio of water to calcium of 0.80.

When the complex and azeotrope addition was completed, 160 grams of 75 pale oil were added to the mixture, and distillation was then carried out to a pot temperature of 148° C. The mixture was then stripped with nitrogen gas.

632.5 grams of a bright product having a base number of 298.2 and a percent activity of 31.9 weight percent were yielded. The combining weight of the product was 485, and the product had a B.S. & W. value of 0.36 weight percent. Its viscosity at 210° F. was 98.9 centistokes.

EXAMPLE 9

A number of runs were carried out to examine the effect of using ammonium hydroxide instead of anhydrous ammonia for neutralization. The aqueous ammonium hydroxide solution used contained about 30 weight percent $NH_3$, and 17.8 grams of $NH_4OH$ were required to completely neutralize 600 grams of hexane-acid mixture having a combining weight of 478 and a total acidity of 25 weight percent.

It was found that, where the procedure hereinbefore described was carried out in a series of overbasing runs using magnesium complex, the total amount of water present in the reaction mixture was excessive (due to that obtained from the ammonium hydroxide), and at both 50 weight percent neutralization and 100 weight percent neutralization, the products were hazy to an undesirable extent. It was found in other $NH_4OH$ runs, however, that the formation of haze could be prevented, and bright, clear products obtained, by (a) adding to the hexane-acid mixture before neutralization, approximately double the amount of methyl Cellosolve which is added to the mixture after neutralization in the procedure where anhydrous ammonia is used, and (b) reducing the amount of water which is added to the mixture after neutralization via azeotrope or otherwise by an amount corresponding to the amount of water incorporated by the use of ammonium hydroxide, as contrasted with anhydrous ammonia.

As an example of the manner of conducting the overbasing step where 100 percent neutralization has been effected using ammonium hydroxide (30 percent $NH_3$), 1000 ml. of magnesium complex and 280 ml. of azeotrope containing 63 weight percent water are added to the mixture as follows:

| Time of addition, minutes | Complex, ml. | Azeotrope, ml. |
| --- | --- | --- |
| 10 | 80 | None |
| 20 | 160 | None |
| 30 | 240 | None |
| 35 | 280 | 26 |
| 40 | 320 | 33 |
| 45 | 360 | 40 |
| 200 | 800 | ᵃ 220 |
| 225 | 1,000 |  |

ᵃ Complete.

The foregoing examples are illustrative of various laboratory preparations of overbased products prepared by the process of the present invention. A number of plant runs have also been carried out utilizing the process of the present invention, and the following examples and tabulated data illustrate the method of conducting these plant runs, the content and chemical character of the materials charged, and the characteristics of the products obtained. It may be stated, in general, that in the plant procedure employed, all of the sulfonic acid material to be initially neutralized is first charged, and in all of the plant runs which have been carried out, the acid has been charged in the form of a mixture with hexane. Following the charging of the hexane-acid material, the acid is neutralized with anhydrous ammonia to a pH of from about 6.5 to about 8.0, depending upon the extent of neutralization desired. Initial quantities of methyl Cellosolve and azeotrope are then generally added to the reaction mixture, although these materials may be added to the hexane-acid mixture prior to ammonia neutralization if desired. The temperature of the reaction mass is then adjusted to a temperature of from about 45° C. to about 50° C., and the simultaneous addition of the metal alkoxide-carbonate complex and water azeotrope is then commenced. In general, the concurrent addition of these materials is carried out at the following rates:

| Complex | Azeotrope |
| --- | --- |
| 0 to 75 wt. percent in 170 min | 0 to 80 wt. percent in 170 min. |
| 75 to 90 wt. percent in 68 min | 80 to 90 wt. percent in 64 min. |
| 90 to 95 wt. percent in 45 min | 95 to 100 wt. percent in 32 min. |
| 95 to 100 wt. percent in 57 min |  |

Upon completion of the addition of complex and azeotrope, the reaction mass is transferred to a still, and the required amount of diluent oil to adjust, as desired, the final percent activity of the product is added. Distillation is then commenced and is carried to a temperature of about 147° C. Upon attainment of this temperature, an inert gas, usually nitrogen, carbon dioxide, or mixtures thereof, is employed to strip the reaction mass for a period of from about 8 to about 14 hours for the purpose of removing the volatile materials from the reaction mass. These materials include water, methyl Cellosolve, residual ammonia gas, and light solvents such as hexane.

EXAMPLE 10

10,683 gallons of a mixture containing 7,158 gallons of hexane and 3,525 gallons of a mixture of sulfonic acids which contained 35 weight percent of Mixture A sulfonic acids, 15 weight percent of Mixture C sulfonic acids, and 50 weight percent of Mixture D sulfonic acids (all as hereinbefore described) were charged to a reactor. The hexane-acid mixture contained 24.6 weight percent sulfonic acids, 33 weight percent nonvolatile materials, 0.40 weight percent water and 6.08 weight percent B.S. & W. The combining weight of the mixed sulfonic acids was 478, and the hexane-acid mixture had a total acidity of 24.6 weight percent. To the charged hexane-acid mixture were then added 560 pounds of anhydrous ammonia to neutralize 97 weight percent of the acid charged.

Upon completion of the neutralization, 427 gallons of methyl Cellosolve were added to the reaction mixture, along with 156 gallons of an azeotrope containing 63.45 weight percent water, 25.45 weight percent methyl Cellosolve and 11.10 weight percent methanol. The temperature of the mixture was then elevated to 49° C. and overbasing of the mixture was commenced. Overbasing was accomplished by the concurrent addition of a magnesium alkoxide-carbonate complex and the described water azeotrope. The complex contained 7.88 weight percent magnesium and 12.44 weight percent carbon dioxide. The mole ratio of magnesium to carobn dioxide in the complex was 0.88.

The first one-third of the complex was added to the reaction mixture at a temperature of 49° C., and in accordance with the rate of addition set forth in the table preceding this example. The second one-third of the complex was added concurrently with a portion of the azeotrope at a tempearture of 55° C. with the azeotrope and complex being added at the rates set forth in the preceding rate table. Finally, the final one-third of the complex and the remaining portion of the azeotrope were added at a tempearture of 58° C. at the rates hereinbefore described. The total amount of water derived from both neutralization, initial addition of azeotrope and addition of azeotrope during overbasing was equivalent to 1.75 moles of water per mole of magnesium added via the complex.

After the complex addition to the reaction mixture had been completed, 2,746 gallons of 75 viscosity pale oil having a gravity of 7.05 pounds per gallon were added to the reaction mixture to adjust the percent activity thereof to approximately 28.0. Distillation was then commenced and carried out until a still bottoms temperature of 150° C. was obtained. The reaction mixture was then stripped with nitrogen gas for a period of ten hours.

From the described process, there were yielded 7,075 gallons of very bright product weighing 61,987 pounds. The final product had a percent activity of 28.3 weight percent and a base number of 313.5. At 210° F. the viscosity of the product was 33.2 centistokes. The B.S. & W. value of the product was 0.08 weight percent after centrifugation. The product contained 7.51 weight percent magnesium and had a specific gravity of 1.052, and a combining weight of 490. The color of the product was considered good by ASTM testing standards.

EXAMPLE 11

For purposes of comparison, a commercially practiced process was employed to prepare a magnesium overbased lubricating oil additive having a base number of about 300. 13,299 gallons of a hexane-sulfonic acid mixture were charged to a reactor. The mixture contained 489 gallons of mixed sulfonic acids made up by mixing 35 weight percent of Mixture A acids, 15 weight percent of Mixture D acids, and 50 weight percent Mixture C acids. An analiysis of the hexane-acid mixture showed the mixture to contain 26.7 weight percent sulfonic acids, 36.7 weight percent non-volatiles, including the hexane, 0.70 weight percent water. The combining weight of the acid was 478 and the total acidity of the mixture was 31.9 weight percent. To the hexane-acid mixture were added 66 gallons of methyl Cellosolve and 613 gallons of a water azeotrope which contained 60.6 weight percent water, 35.3 weight percent methyl Cellosolve and 4.1 weight percent methanol. Following this addition of methyl Cellosolve and azeotrope, the temperature of the reaction mixture was elevated to 48° C.

The concurrent addition of magnesium alkoxide-carbonate complex and water azeotrope was then commenced. The magnesium complex contained 7.74 weight percent magnesium, 1 weight percent carbon dioxide and had a mole ratio of magnesium to carbon dioxide of 1.00. The complex was added in increments of thirds at the rates described in the table immediately preceding Example 10, and at the incremental temperatures set forth in Example 10. The total amount of water incorporated in the reaction mixture by neutralization of the acid and the addition of the azetrope was the equivalent of 2.05 moles water per mole of magnesium added with the complex.

After the addition of complex and azeotrope to the reaction mixture was completed, the reaction mixture was transferred to a still, and 5,283 gallons of 75 viscosity pale oil were added to the mixture for the purpose of adjusting the final activity of the product to be yielded to approximately 28 weight percent. Distillation was then commenced and continued to a pot temperature of 148° C. to accomplish the removal of excess water, methyl Cellosolve and hexane. The mixture was then stripped with nitrogen for a period of 11 hours.

There were yielded 9,849 gallons of bright, clear product weighing 87,164 pounds. The percent activity of the product was 26.7 weight percent, and its base number was 300.0. The viscosity of the product was 32.0 centistokes at 210° F, and the combining weight of the product was 490. The B.S. & W. value of the product after centrifugation was 0.5 weight percent.

EXAMPLE 12

Two additional plant runs were carried out for the purpose of preparing, by the process of the present invention, products having base numbers of about 300, and percent activities of about 28. The procedures used in these plant runs were substantially the same as those described in Example 10, although the quantites of reactants employed and the extent of neutralization carried out differed slightly. Thus, in these two runs, referred to hereinafter as Runs 12a and 12b, the variation in properties and quantities of the reactants used therein from the reactants used in Example 10, and variation of the extent of neutralization involved were as follows:

|  | Ex. 10 | Run 12a | Run 12b |
|---|---|---|---|
| Hexane-sulfonic acid analysis, wt. percent: | | | |
| RSO₃H | 24.6 | 26.5 | 26.5 |
| Non-volatiles | 33.0 | 36.5 | 35.8 |
| H₂O | 0.40 | 0.50 | 0.30 |
| B.S. & W | 0.08 | 0.14 | 0.15 |
| Combining weight | 478 | 478 | 478 |
| Total acidity | 24.6 | 26.7 | 26.3 |
| Quantities of chemicals: | | | |
| Hexane-acid, gals | 10,683 | 13,762 | 13,288 |
| Anhydrous ammonia, lbs | 560 | 800 | 763 |
| Methyl Cellosolve, gals | 427 | 551 | 531 |
| Initial azeotrope, gals | 156 | 192 | 171 |
| Complex, gals | 5,772 | 8,139 | 8,148 |
| Overbasing azeotrope, gals | 1,966 | 2,614 | 2,389 |
| 75 vis. pale oil, gals | 2,746 | 4,263 | 4,350 |
| Wt. percent of acid neutralization | 97 | 103 | 97 |
| Mole ratio of H₂O:Mg | 1.75 | 1.65 | 1.55 |

The products prepared in the plant runs described in Examples 10, 11 and 12 (Runs 12a and 12b) are compared in Table I, from which it will be perceived that in the case of Run 12b, the low water to metal ratio (1.55) resulted in a very substantial increase in the viscosity of the product.

TABLE I

|  |  |  | Ex. 12 | |
|---|---|---|---|---|
|  | Ex. 10 | Ex. 11 | Run 12a | Run 12b |
| Product yield: | | | | |
| Gallons | 7,075 | 9,849 | 10,168 | 10,181 |
| Pounds | 61,987 | 87,164 | 89,334 | 89,455 |
| Product analysis: | | | | |
| Percent active | 28.3 | 26.7 | 27.9 | 28.5 |
| Base number | 313.5 | 300.0 | 301.3 | 317.4 |
| Viscosity, cs. at 210° F | 33.2 | 32.0 | 45.9 | 617.2 |
| Wt. percent B.S. & W | 0.08 | 0.05 | 0.1 | 0.30 |
| Combining weight | 490 | 490 | 490 | 490 |
| Clarity | (¹) | (¹) | (¹) | (¹) |

¹ Very bright.

EXAMPLE 13

Using the plant procedure described in Examples 10 and 12, the process of the present invention was utilized in two different plant runs for preparing products having a percent activity of 26.3 weight percent and 27.0 weight percent, respectively, and having approximate base numbers of 400. These runs, hereinafter referred to as Runs 13a and 13b, were carried out using reactants and reaction conditions set forth in Table II below. For purposes of comparison, a plant run using heretofore commercially employed overbasing procedures of the type described in Example 11 was carried out with the objective of preparing a product having a base number of about 400 and a percent activity corresponding substantially to that of the products prepared in Runs 13a and 13b. This comparative run (by the process previously in use for accomplishing overbasing) is hereinafter referred to as Run 13c, and the properties and characteristics of the reactants employed, and also certain specific reaction conditions utilized, are set forth in Table II.

TABLE II

| Run | 13a | 13b | 13c |
|---|---|---|---|
| Hexane-sulfonic acid analysis: | | | |
| Wt. percent RSO₃H | 19.4 | 25.5 | 25.0 |
| Wt. percent total acid | 19.4 | 25.5 | 25.2 |
| Wt. percent non-volatiles | 25.7 | 33.7 | 35.4 |
| Wt. percent water | 0.40 | 0.50 | 0.55 |
| Wt. percent B.S. & W | 0.10 | 0.08 | 0.08 |
| Combining weight | 478 | 478 | 478 |
| Azeotrope analysis, wt. percent: | | | |
| H₂O | 63.45 | 63.0 | 59.2 |
| Methyl Cellosolve | 25.45 | 27.60 | 30.8 |
| Methanol | 11.10 | 9.40 | 10.0 |
| Magnesium complex analysis: | | | |
| Wt. percent Mg | 7.90 | 7.84 | 7.80 |
| Wt. percent CO₂ | 12.89 | 12.94 | 14.15 |
| Mole ratio Mg:CO₂ | 0.89 | 0.91 | 1.00 |
| Material quantities: | | | |
| Hexane-sulfonic acid, gals | 13,635 | 12,326 | 11,539 |
| Anhydrous ammonia, lbs | 555 | 674 | (¹) |
| Methyl Cellosolve, gals | 409 | 370 | 57 |
| Intial azeotrope, gals | 169 | 208 | 394 |
| Complex, gals | 8,018 | 8,559 | 8,108 |
| Overbasing azeotrope, gals | 3,075 | 3,257 | 4,253 |
| 75 vis. pale oil, gals | 2,497 | 2,557 | 2,919 |
| Wt. percent acid neutralized | 97 | 97 | |
| Mole ratio H₂O:Mg | 1.90 | 1.90 | 2.55 |

¹ 581 gals. of complex.

The products which were prepared by Runs 13a, 13b and 13c (the latter, of course, being the product prepared by the process utilized prior to the present invention) were compared, and the yields and properties of these products are set forth in Table III.

TABLE III

| Run | 13a | 13b | 13c |
|---|---|---|---|
| Product yield: | | | |
| Pounds | 64,978 | 71,912 | 73,122 |
| Gallons | 6,954 | 7,696 | 7,854 |
| Product Analysis: | | | |
| Percent active | 26.3 | 27.0 | 27.0 |
| Base number | 433.2 | 406.0 | 400.0 |
| Viscosity, cs. at 210° F | 85.9 | 54.5 | 225.0 |
| Wt. percent B.S. & W | 0.07 | 0.05 | 0.09 |
| Combining weight | 490 | 490 | 490 |
| Clarity | (¹) | (¹) | Bright |

¹ Very bright.

The substantially lower viscosity of the ca. 400 base number products prepared by the process of the present invention, as compared to the Run 13c product prepared by a previously employed process in commercial usage is readily apparent.

Example 14

11,778 gallons of a hexane-sulfonic acid mixture containing 8,680 gallons of hexane and 3,098 gallons of mixed sulfonic acids of the type described in Examples 12 and 13 were charged to a reactor. The mixture contained 26.3 weight percent non-volatiles, 0.50 weight percent water and had a combining weight of 478. 467 pounds of anhydrous ammonia were charged to the hexane-sulfonic acid mixture to neutralize 97 weight percent of the acids. Upon completion of neutralization to this extent, 118 gallons of methyl Cellosolve and 99 gallons of a water azeotrope were added to the mixture. The azeotrope contained 64.05 weight percent water, 35.45 weight percent methyl Cellosolve and 0.50 weight percent methanol. The temperature of the reaction mixture was then increased to 48° C., and overbasing of the mixture was commenced.

For the purpose of overbasing, 9,402 gallons of a magnesium alkoxide-carbonate complex was added to the mixture simultaneously with 3,966 gallons of the described azeotrope. The complex contained 7.78 weight percent magnesium and 13.26 weight percent carbon dioxide, and was characterized in having a mole ratio of magnesium to carbon dioxide of 0.94. The first third of the magnesium complex was added to the reaction mixture at a temperature of 48° C. The second third of the complex was added at a temperature of 54° C., and the final one-third of the complex was added at a temperature of 57° C. The additions of complex and azeotrope were carried out at the rates set forth in the rate table immediately preceding Example 10. The total amount of water incorporated in the reaction mixture by neutralization and by addition of azeotrope was equivalent to an amount yielding a mole ratio of water to magnesium of 2.10.

Upon completion of the addition of the complex and azeotrope to the reaction mixture, the mixture was transferred to a still and, preliminary to commencing the distillation of volatile materials from the mixture, 1,590 gallons of 75 viscosity pale oil were added to the mixture. The distillation was then carried out to a pot temperature of 148° C., followed by stripping with a mixture of nitrogen and carbon dioxide for a period of 12 hours.

The process yielded 5,828 gallons of bright, fluid overbased product weighing 58,583 pounds. The product had a percent activity of 27.1 weight percent, and a base number of 529.4. The viscosity of the product at 210° F. was 193.4 centistrokes, and its combining weight was 490. The product has a B.S. & W. value of 0.10 weight percent and contained 12.23 weight percent magnesium. The ASTM color of the product was good, and its specific gravity was 1.207.

It may be perceived in comparing the 500+ base number product produced by the run described in Example 14 with the 400 base number product produced by conventional procedures as described in Run 13c in Example 13 that the viscosity of the 500+ base number product prepared by the present invention is substantially lower than is the viscosity of the 400 base number product prepared by conventional procedures.

EXAMPLE 15

For the purpose of evaluating the criticality of the extent to which neutralization of the acid starting material with ammonium ions is carried out, four runs were made in which the extent of neutralization was varied in preparing four products having base numbers of about 300. In each of these runs, 2000 grams of a mixture of hexane with alkaryl sulfonic acids were used as the starting material. The total acidity of the hexane-acid mixture was 22 weight percent which required 16.8 grams of $NH_3$ for 100 percent neutralization. Neutralization levels were verified by aliquoting 10 gram samples and analyzing for acid ratio.

After neutralizing to the extent employed in the run, methyl Cellosolve and water azeotrope were added to the reaction mass. Additional water azeotrope and a mixture of magnesium alkoxide-carbonate complex with magnesium alkoxy ethanol (90:10 weight ratio) were then added concurrently over a period of four hours to the reaction mass, followed by addition of pale oil and distillation to 150° C. The reaction mixture was then stripped with nitrogen at a rate of 1500 ml./minute for a period of 20 minutes. The extent of neutralization carried out, and the characteristics of the products obtained are set forth in Table IV.

TABLE IV

| Run | A | B | C | D |
|---|---|---|---|---|
| Wt. percent acid neutralized | 50 | 90 | 100 | 110 |
| Product properties: | | | | |
| Viscosity, cs. at 210° F | 136.0 | 55.3 | 35.6 | 229.8 |
| Compatibility [1] | Fail | Pass | Pass | |
| Filterability [2] | Fail | Pass | Pass | |
| Clarity | [3] | [3] | [3] | |

[1] Refers to compatibility with a commercially available ashless detergent-dispersant lubricating oil additive.
[2] Refers to the filterability of the product when contaminated with water.
[3] Bright and clear.

From the comparison of the products set forth in Table IV, it will be apparent that superior products result from carrying the neutralization to the extent of neutralizing at least 90 weight percent of the acid, and avoiding the addition of ammonia in excess of that required for complete neutralization.

EXAMPLE 16

Four runs, E, F, G and H were carried out identically to those described in Example 15 except that the amounts of pale oil and overbasing materials added to the reaction mixture were varied to yield products having a base number of about 400. Table V records the results obtained in these runs.

TABLE V

| Run | E | F | G | H |
|---|---|---|---|---|
| Wt. percent acid neutralized | 50 | 90 | 100 | 110 |
| Product properties: | | | | |
| Viscosity, cs. at 210° F | 180.5 | 47.6 | 32.5 | 139.8 |
| Compatibility | | Pass | Pass | |
| Filterability | | Pass | Pass | |
| Clarity | [1] | [1] | [1] | Hazy |

[1] Bright and clear.

From the foregoing description of the invention, it will be percieved that the process of the invention yields valuable overbased oil soluble compositions. Engine tests have established their effectiveness as lubricating oil additives. Although certain preferred embodiments of the invention have been herein described in detail in order to elucidate the basic principles of the invention, and provide guidelines for its practice, it will be understood that various changes and innovations in reaction conditions and reactant species and characteristics can be effected without departure from the basic priciples of the invention. Changes and modifications of this type are deemed to be circumscribed by the spirit and scope of the invention except as the same may be limited by the appended claims or reasonable equivalents thereof.

What is claimed is:
1. A method of preparing an overbased alkaline earth metal oil soluble composition wherein said alkaline earth metal is selected from the group consisting of magnesium, calcium, and mixtures thereof, said method comprising:
   (a) adding sufficient ammonium ions to an oil soluble dispersing agent having an average molecular weight of from about 350 to about 1000 and selected from the group consisting of sulfonic acids, carboxylic acids and phosphorus sulfide-treated olefins, so that from about 90 to about 100 weight percent of said dispersing agent is converted to the ammonium salt;
   (b) heating the oil soluble ammonium salt dispersing agent of step (a) to a temperature of from about 25° C. to about 80° C.;
   (c) adding to the heated dispersing agent, while the temperature thereof is maintained between about 25° C. and 80° C., a metal alkoxide-carbonate complex, said addition of complex being made in the presence of an amount of water exceeding the stoichiometric requirement to hydrolyze the metal alkoxide-carbonate complex;
   (d) heating the reaction mixture to a pot temperature of from about 125° C. to about 160° C. to remove volatile materials therefrom; then

(e) stripping the bottoms material remaining after removal of volatile materials therefrom by passing an inert gas through the bottoms material at substantially the final temperature of the distillation, said method being characterized further in that the metal alkoxide complex is represented by the formula

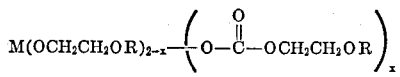

where M is a bivalent metal ion selected from the group consisting of calcium and magnesium, and R is either a $C_1$ to $C_6$ alkyl group, or an organic radical of the formula

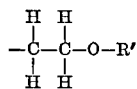

where R' is a $C_1$ to $C_4$ alkyl group, and $x$ is from 0.5 to 1.5, preferably 0.75 to 1.0, and contains from about 5 weight percent to about 8 weight percent metal.

2. The method defined in claim 1 and further characterized as including the step of adding a non-volatile, oil soluble, oleaginous diluent material having a boiling point of at least 160° C. to the reaction mixture at some point in time prior to the removal by distillation of 25 weight percent of all volatile diluent materials present in the reaction mixture.

3. The method of claim 2 wherein the amounts of dispersing agent, non-volatile and metal complex are such that the final product contains the following amounts:

| | Parts by weight |
|---|---|
| Dispersing agent | About 15 to about 40 |
| Non-volatile diluent | About 20 to about 60 |
| Metal compound (as metal) | About 15 to about 45 |

4. The method defined in claim 3 wherein the dispersing agent comprises at least one oil soluble alkaryl sulfonic acid.

5. The method defined in claim 4 wherein at least a portion of the total water in the reaction mixture upon commencement of the addition of the alkoxide-carbonate complex is added to the reaction mixture prior to addition of the complex.

6. The method defined in claim 5 wherein said complex is added in admixture with an alkaline earth metal alkoxy alkoxide in which the metal component is selected from the group consisting of calcium and magnesium, said alkaline earth metal alkoxy alkoxide being present in the mixture with said complex in an amount up to 25 weight percent.

7. The method defined in claim 6 wherein said oil soluble dispersing agent is heated to a temperature of from about 40° C. to about 60° C. preparatory to commencing the addition of said complex.

8. The method defined in claim 4 wherein the presence of water in the reaction mixture during the addition of said complex is accomplished, in part, by adding to the reaction mixture concurrently with the complex, an alcohol-water azeotrope.

9. The method defined in claim 8 wherein said complex contains from about 7 weight percent to about 8 weight percent calcium metal, and wherein the amount of water present in the reaction mixture during the addition of said complex is from about 0.75 mole to about 6.0 moles of water per mole of the complex added.

10. The method defined in claim 8 wherein said complex contains from about 7 weight percent to about 8 weight percent magnesium metal, and wherein the amount of water present in the reaction mixture during addition of the complex is from about 1.5 moles to about 4.5 moles of water per mole of the complex added.

11. The method defined in claim 1 wherein prior to neutralization, said neutralized oil soluble material is diluted with a paraffin hydrocarbon solvent having a boiling point below about 160° C. in an amount equivalent to from about 25 weight percent to about 75 weight percent of the total weight of solvent and oil soluble material to be neutralized.

12. The method defined in claim 1 wherein the inert gas passed through said bottoms material is a mixture of nitrogen and carbon dioxide.

13. The method defined in claim 1 wherein said dispersing agent comprises a mixture of monoalkylbenzene sulfonic acids in which the alkyl substituents are straight chain groups derived from straight chain α-olefins containing from about 18 to about 40 carbon atoms, said sulfonic acids having an average molecular weight of from about 400 to about 675.

14. The method defined in claim 1 wherein said dispersing agent comprises a mixture of sulfonic acids resulting from the sulfonation of an alkylate material having the following composition:

| | Wt. percent |
|---|---|
| Di-n-alkylbenzenes | 30 to 75 |
| Diphenylalkanes | 5 to 30 |
| Alkylated tetralins | 5 to 50 |
| Other materials, including naphthalenes and indanes | 4 to 12 | said alkylate having an average molecular weight of from about 300 to about 450, and wherein the alkyl substituents of the di-n-alkylbenzenes contain from about 8 to about 20 carbon atoms, and are bonded to the benzene group through a secondary carbon atom.

15. The method defined in claim 1 wherein said dispersing agent comprises at least 70 weight percent of a mixture of monoalkaryl sulfonic acids in which the aryl group is substituted by a highly branched single alkyl substitutent containing from about 20 carbon atoms to about 40 carbon atoms, said mixture of sulfonic acids having an average molecular weight of from about 400 to about 675.

16. The method defined in claim 4 wherein said metal complex is a magnesium alkoxide-carbonate complex and said oil soluble ammonium salt dispersing agent is heated to a temperature of from about 40° C. to about 60° C. and is maintained at said temperature during the addition of said complex.

17. The method defined in claim 16 and further characterized as including the step of adding a non-volatile, oil soluble oleaginous diluent material having a boiling point of at least 160° C. to the reaction mixture at a time prior to the commencement of distillation of the reaction mixture.

18. The method defined in claim 17 wherein said complex is added to an extent sufficient to impart an acetic base number of over 400 to the final product remaining after stripping of the bottoms by passing an inert gas therethrough, and wherein said non-volatile diluent material is added in an amount such that the percent activity of said final product is less than 40 weight percent.

19. The method defined in claim 18 wherein said magnesium complex is of the formula

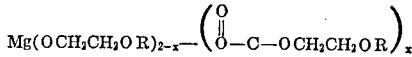

where R is either a $C_1$ or $C_2$ alkyl group, and $x$ is from 0.95 to 1.0.

20. The method defined in claim 19 wherein the presence of water in the reaction mixture during the addition of said complex is accomplished by the described neutralization and by the addition of a water-alcohol azeotrope to the reaction mixture, at least a portion of said azeotrope being incorporated concurrently with said addition of complex.

21. The method defined in claim 19 wherein said neutralized oil soluble acidic material consists essentially of a mixture of alkylbenzene sulfonic acids, and wherein said mixture of sulfonic acids is diluted with a volatile liquid paraffinic hydrocarbon having a boiling point below about 160° C.

22. The method defined in claim 19 wherein said volatile liquid paraffinic hydrocarbon is normal hexane, and is present in an amount of from about 50 weight percent to about 75 weight percent, based on the total weight of the hexane and mixture of acids.

23. The method defined in claim 19 wherein said magnesium complex contains from about 7 weight percent to about 8 weight percent magnesium metal.

References Cited

UNITED STATES PATENTS

| | | | |
|---|---|---|---|
| 2,895,913 | 7/1959 | Carlyle et al. | 252—33 |
| 3,150,089 | 9/1964 | Hunt | 252—33 |
| 3,428,564 | 2/1969 | Bluestein et al. | 252—33 |

DANIEL E. WYMAN, Primary Examiner

I. VAUGHN, Assistant Examiner

U.S. Cl. X.R.

252—33, 33.4, 39